United States Patent [19]

Taniguchi et al.

[11] Patent Number: 5,348,518
[45] Date of Patent: Sep. 20, 1994

[54] AUTOMATIC TRANSMISSION

[75] Inventors: Takao Taniguchi; Kazumasa Tsukamoto; Masahiro Hayabuchi; Koji Noda, all of Anjo, Japan

[73] Assignees: Aisin A W Kabushiki Kaisha; Toyota Jidosha Kabushiki Kaisha, both of Aichi, Japan

[21] Appl. No.: 518,210

[22] Filed: May 3, 1990

[30] Foreign Application Priority Data

May 10, 1989 [JP] Japan .................. 1-115107

[51] Int. Cl.$^5$ ............................ F16H 57/10
[52] U.S. Cl. .................. 475/285; 475/116; 475/159; 475/292; 74/606 R
[58] Field of Search .............. 74/606 R; 475/116, 159, 475/330, 291, 292, 284, 285

[56] References Cited

U.S. PATENT DOCUMENTS

| | | | |
|---|---|---|---|
| 4,233,861 | 11/1980 | Gaus et al. | 74/763 |
| 4,660,439 | 4/1987 | Hiraiwa | 74/763 |
| 4,736,653 | 4/1988 | Hayakawa et al. | 74/606 R X |
| 4,831,892 | 5/1989 | Shindo et al. | 74/606 R X |

Primary Examiner—Allan D. Herrmann
Assistant Examiner—Ryan W. Massey
Attorney, Agent, or Firm—Koda and Androlia

[57] ABSTRACT

An automatic transmission comprising a torque converter and a change-speed transmission having a plurality of planetary gearsets and friction elements. This automatic transmission has a central supporting member fixedly mounted in a transmission case. A drum supported by this central supporting member contains clutch components and a one-way clutch inside. On the outer cylinder of the drum is mounted a band brake. The outer race of the one-way clutch in the drum is connected to the clutch hub in the drum, while the inner race of the one-way clutch is connected to the outer cylinder of the drum.

4 Claims, 3 Drawing Sheets

AUTOMATIC TRANSMISSION

BACKGROUND OF THE INVENTION

1. Field of the Invention

The present invention relates to an automatic transmission for automobiles using a torque converter and planetary gear train.

The automatic transmission using the torque converter and a plurality of rows of planetary gearsets provides different gear ratios by selectively engaging the planetary gearsets by friction members.

2. Description of the Prior Art

In the automatic transmission having multi-step gearshift positions, an increased number of planetary gear trains and friction elements are employed.

Generally, of the friction elements, clutch components having a clutch piston, friction plates. separate plates and a clutch hub are disposed in the drum, supplying the servo oil pressure from the inner cylinder side of the drum. For brakes, multiple-disc brakes and band brakes are adopted. Regarding band brakes, a brake drum contains the clutch components for the purpose of enabling the use of a compact transmission. In such a drum, a torque is applied to the drum by clutch engagement and band brake application. It is, therefore, necessary to support the drum firmly and also to give a due consideration the elimination of an effect of a stress applied to the drum on the supporting mechanism of other power transmission members.

SUMMARY OF THE INVENTION

It is an object of the present invention to solve the technological problems described above and to provide an automatic transmission having a drum supporting device of such a constitution that a clutch hub contained in the drum is formed integral with the outer race of a one-way clutch and also the inner race of the one-way clutch is connected to the drum, and that a brake is disposed on the outer cylinder of the drum.

To accomplish the above-mentioned object, the automatic transmission of the present invention comprises a central supporting member fixedly installed in the transmission case; a drum including outer and inner cylinders, the inner cylinder being rotatably supported on the inner periphery of the central supporting member; clutch components disposed in the drum; a band brake mounted on the outer cylinder of the drum; and a one-way clutch provided in the drum; the outer race of the one-way clutch being connected to the clutch hub and the inner race of the one-way clutch being connected to the outer cylinder of the drum.

The above and other objects, features and advantages of the present invention will become apparent from the following description with reference to the accompanying drawings.

DETAILED DESCRIPTION OF THE PREFERRED EMBODIMENTS

The preferred embodiments of the present invention will hereinafter be explained with reference to the accompanying drawings.

Figure 1:
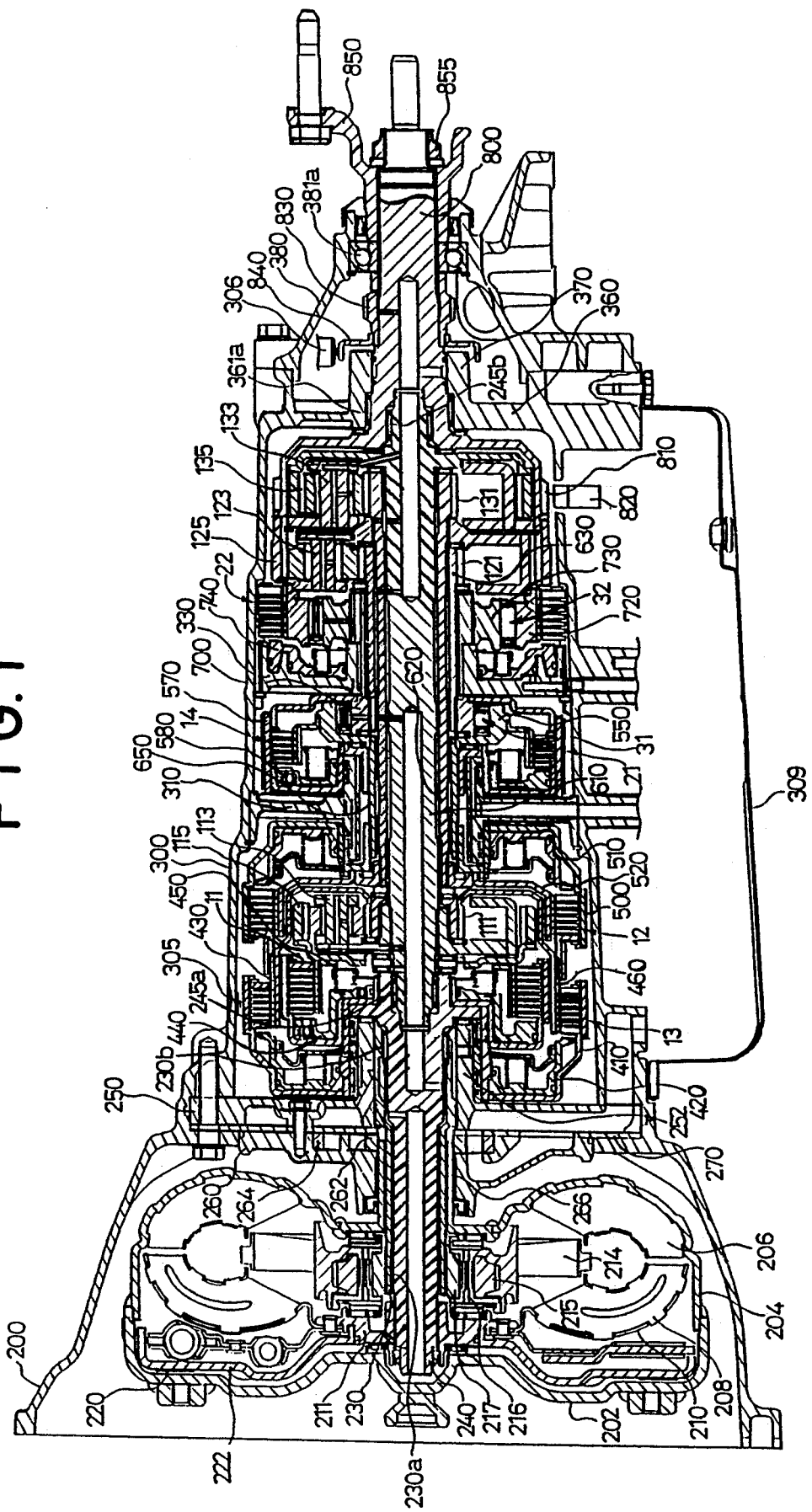
FIG. 1 is a general sectional view of an automatic transmission according to the present invention.
Figure 2:
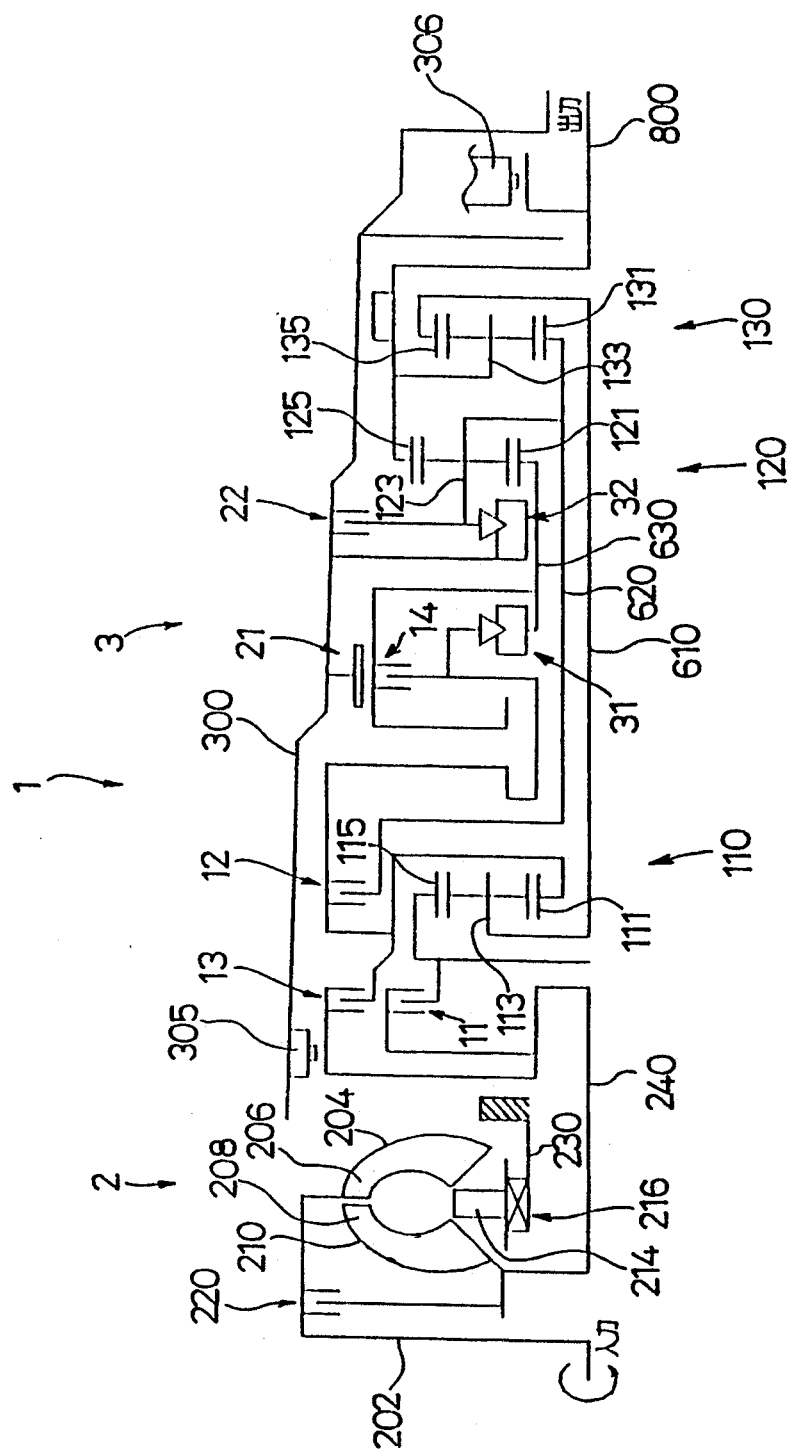
FIG. 2 is a schematic diagram of a gear train used in this automatic transmission according to the present invention.

FIG. 1 is a general sectional view showing the automatic transmission according to the present invention, and FIG. 2 is a schematic diagram of the gear train. First the automatic transmission will be described by referring to FIG. 2.

An automatic transmission 1 has a torque converter 2 and a change-speed transmission 3 with planetary gearsets. As the torque converter 2, a suitable means such as a hydraulic coupling, an electromagnetic clutch, a multiple-disc clutch, and a centrifugal clutch can be selected beside a hydraulic torque converter shown in the present embodiment.

The torque converter 2 has a rear cover 204 connected to the rear end of a front cover 202 which is driven to rotate by an engine, and a pump impeller 206 formed on the inner wall surface of the rear cover 204. A turbine runner 208 disposed oppositely to the pump impeller 206 is held by a turbine shell 210. The turbine shell 210 is coupled to an input shaft 240 which serves as an output member of the torque converter 2 and also as an input member of the change-speed transmission 3 by its inner peripheral portion. Between the pump impeller 206 and the turbine runner 208 disposed a stator 214, the inner peripheral portion of which is coupled with the outer race of a one-way clutch 216. The inner race of the one-way clutch 216 is fixedly mounted on the outer peripheral portion of a supporting cylinder 230 which is a stationary member. Between the front cover 202 and the turbine shell 210 is disposed a lockup clutch 220 directly coupling the front cover 202 with the turbine shell 210.

The change-speed transmission 3 has a case, which a planetary gear train and friction elements are contained. The planetary gear train comprises three rows of simple planetary gearsets 110, 120 and 130.

A pinion carrier 113 of a first simple planetary gearset 110 is connected to a ring gear 135 of a third simple planetary gearset 130, and a carrier 133 of the third simple planetary gearset 130 is connected to a ring gear 125 of a second simple planetary gearset 120 and also to an output shaft 800. A sun gear 131 of the third simple planetary gearset 130 is connected to a carrier 123 of the second simple planetary gearset 120 and also to a sun gear 121 of the second simple planetary gearset 120 through the friction elements.

The friction elements include four clutches, two brakes and two one-way clutches, The relation of connection with friction elements and each element of the planetary gear train is as described below.

The input shaft 240 of the change speed transmission 3 is connected to the drum of a first clutch 11 and to the drum of a third clutch 13. The hub of the third clutch 13 is connected to a ring gear 115 of first simple planetary gearset 110, and the hub of the third clutch 13 is connected to a sun gear 111 of the first simple planetary gearset 110. The hub of the third clutch 13 is connected to the drum of a second clutch 12 and further to the hub of a fourth clutch 14 and the outer race of a first one-way clutch 31.

The hub of the second clutch 12 is connected to a sun gear 131 of the third simple planetary gearset 130 through a second intermediate shaft 620, and also to the carrier 123 of the second simple planetary gearset 120, This carrier 123 further connected to the outer race of the second one-way clutch 32 which serves also as the hub of a second brake 22. The inner race of the second one-way clutch 32 is attached to a case 300 which is a stationary member.

The drum of the fourth clutch 14 serves as the drum of a first brake 21, and also is connected to the sun gear 121 of the second simple planetary gearset 120 through the inner race of the first one-way clutch and a third intermediate shaft 630.

The carrier 113 of the first simple planetary gearset 110 is connected to the ring gear 135 of the third simple planetary gearset 130 through a first intermediate shaft 610, and the carrier 133 is connected to the output shaft 800 and to the ring gear 125 of the second simple planetary gearset 120.

On the outer side of the third clutch 13 which is directly coupled to the input shaft 240, a first rotation sensor 305 is mounted to obtain an information on the rotation of the input shaft 240. On the outer side of the output shaft 800 also is mounted a second rotation sensor 306 to obtain an information on the rotation of the output shaft 800.

FIG. 1 is a sectional view showing the concrete construction of the automatic transmission having the schematic diagram explained with reference to FIG. 2.

The torque converter 2 used in the automatic transmission 1 is a hydraulic torque transmitting device, which is housed inside of a housing 200 opening on the engine side (hereinafter referred to as the "front side"). At the rear of the front cover 202 driven by the power from the engine is integrally mounted the rear cover 204. On the inner peripheral wall surface of the rear cover 204 is formed the pump impeller 206. The turbine runner 208 disposed facing with the pump impeller 206 is supported by the turbine shell 210. The turbine shell 210 is connected to the input shaft 240, which serves as the output member of the torque converter 2 and an input member of the change-speed transmission 3, through a connecting member 211 at the peripheral portion thereof. Between the pump impeller 206 and the turbine runner 208 is disposed the stator 214. The inner peripheral part of this stator 214 is connected to an outer race 215 of a one-way clutch 216, and an inner race 217 of the one-way clutch 216 is attached the front end outer peripheral part of the supporting cylinder 230. Between the front cover 202 and the turbine shell 210 is disposed the lockup clutch 220 having a lockup piston 222.

To the rear part of the housing 200 is connected the cylindrical case 300 containing the component elements of the change-speed transmission 3. To the joint sections of the housing 200 and the transmission case 300, an oil pump housing 260 is attached through an oil pump cover 250 and a partition plate 270. In the oil pump housing 260 is housed an internal gear pump constituted of an external gear 262 and an internal gear 264. The inner peripheral part of the external gear 262 is connected to a shaft 266 formed integral with the rear cover 204. the central part of the oil pump cover 250 forms a cylindrical supporting section 252 protruding out rearwardly, and in the inner peripheral portion of this supporting section 252 is press-fitted the rear outer peripheral section of the supporting cylinder 230.

The supporting cylinder 230 is used to support the input shaft 240 through bearings 230a and 230b at two points of the inner peripheral section thereof. On the rear portion of the input shaft 240 is formed a flange section expanding in a radical direction. On the outer peripheral section is mounted a drum 410 which contains the third clutch 13. In this drum 410 a piston 420 operating the third clutch 13 is arranged. On the outer peripheral portion at the rear end of the input shaft 240 is mounted a drum 430 which contains the first clutch 11, In the drum 430 is disposed a piston 440 which operates the first clutch 11. A hub 450 of the first clutch 11 is connected integrally with the ring gear 115 of the first simple planetary gearset. A hub 460 of the third clutch 13 is integrally connected at the inner peripheral section with the sun gear 111 of the first simple planetary gearset. The carrier 113 of the first simple planetary gearset is connected with the intermediate shaft 610. The hub 460 of the third clutch 13 is connected at the outer peripheral section with the drum 500 containing the second clutch 12. In this drum 500 is disposed a piston 510 which operates the second clutch 12.

A hub 520 of the second clutch 12 is connected the inner peripheral section with the second intermediate shaft 620, which is concentrically supported on the outer peripheral section of the first intermediate shaft 610. the drum 500 of the second clutch 12 is integrally connected through its inner cylinder section with a sleeve 650 on the outer peripheral section of the second intermediate shaft 620.

In the transmission case 300, a first central supporting member 310 and a second central supporting member 330 are attached. The inner peripheral part of the first central supporting member 310 has a cylindrical form longitudinally projecting. A servo oil pressure is supplied into a related drum through this cylindrical part.

The rear end portion of the sleeve 650 is connected to the outer race 550 of the first one-way clutch 31. The outer race 550 is integrally connected to the hub of the fourth clutch 14. The outer peripheral surface of a drum 570 in which the fourth clutch 14 is installed serves as the drum of the first brake 21. In the drum 570 is arranged a piston 580 which operates the fourth clutch 14.

An inner race 700 of the first one-way clutch 31 is in connection with third intermediate shaft 630 supported on the outer peripheral portion of the second intermediate shaft 620, and the sun gear 121 of the second simple planetary gearset is formed at the rear end section of the third intermediate shaft 630.

The carrier 123 of the second simple planetary gearset is in mesh with splines on the second intermediate shaft 620. At the rear end of this second intermediate shaft 620 is formed the sun gear 131 of the third simple planetary gearset.

The carrier 123 of the second simple planetary gearset is connected to an outer race 720 of a second one-way clutch 32, the outer race 720 serving also as the hub of the second brake 22. The inner race 730 of the second one-way clutch 32 is fixedly attached to the second central supporting member 330. In the rear wall surface of the second central supporting member 330 is disposed a piston 740 which operates the second brake 22.

The rear end of the first intermediate shaft 610 is supported by the output shaft 800 through a bearing. Immediately before the bearing, the first intermediate shaft 610 is expanded in a form of flange, on the outer peripheral part of which is formed the ring gear 135 of the third simple planetary gearset. The carrier 133 of the third simple planetary gearset is connected to the ring gear 125 of the second simple planetary gearset and also to the output shaft 800.

At the inner peripheral section of the rear wall 360 of the transmission case 300, a cylindrical support section 370 is formed to support the front portion of the output shaft 800 through a bearing 361a. At the rear end of the case 300 is concentrically fixed a rear case 380 through an engaging section, and the rear portion of the output shaft 800 is supported by the rear case 380 through a bearing 381a. Accordingly the output shaft 800 is firmly supported on the bearings 361a and 381a at two points, and the first intermediate shaft 610 is firmly supported at the front and rear ends by the input shaft 240 and the output shaft 800 through bearings 245a and 245b.

On the front drum-like outer peripheral portion of the output shaft 800 is formed a parking gear 810, constituting, together with a pawl 820 oppositely arranged, a parking brake. On the output shaft 800 are mounted a speedometer drive gear 830 and a flange 840 having a slit around, through which an information on the rotation of the output shaft 800 is obtained by the rotation sensor 308. On the rear end portion of the output shaft is securely mounted a connecting member 850 by a nut 855.

At the bottom of the transmission case 300 is mounted a hydraulic control device which is not illustrated, which is covered with a cover 309 serving also as an oil pan.

The automatic transmission of the present invention, as described above, comprises four clutches, two brakes, and two one-way clutches, as friction elements, to achieve five forward speeds and one reverse speed. Table 1 shows the operating condition of each friction element at each gearshift position.

TABLE 1

|  | Clutch | | | | Brake | | One-way clutch | |
|---|---|---|---|---|---|---|---|---|
|  | 11 | 12 | 13 | 14 | 21 | 22 | 31 | 32 |
| 1st | O |   |   | (O) |   | (O) | O | O |
| 2nd | O | O |   |   |   | (O) |   | O |
| 3rd | O | O | O |   |   | (O) |   | O |
| 4th | O | O | O |   |   |   | O |   |
| 4Ath |   | O | O |   |   |   | O |   |
| 5th |   | O | O |   | O |   |   |   |
| Reverse |   |   | O | O |   | O |   |   |

In the above table, the mark "O" indicates the engagement of the friction element. The mark (O) indicates engagement during engine brake application. The 4A speed has the same gear ratio as the 4th speed, and appears immediately before a shift to the 5th is made.

Figure 3:
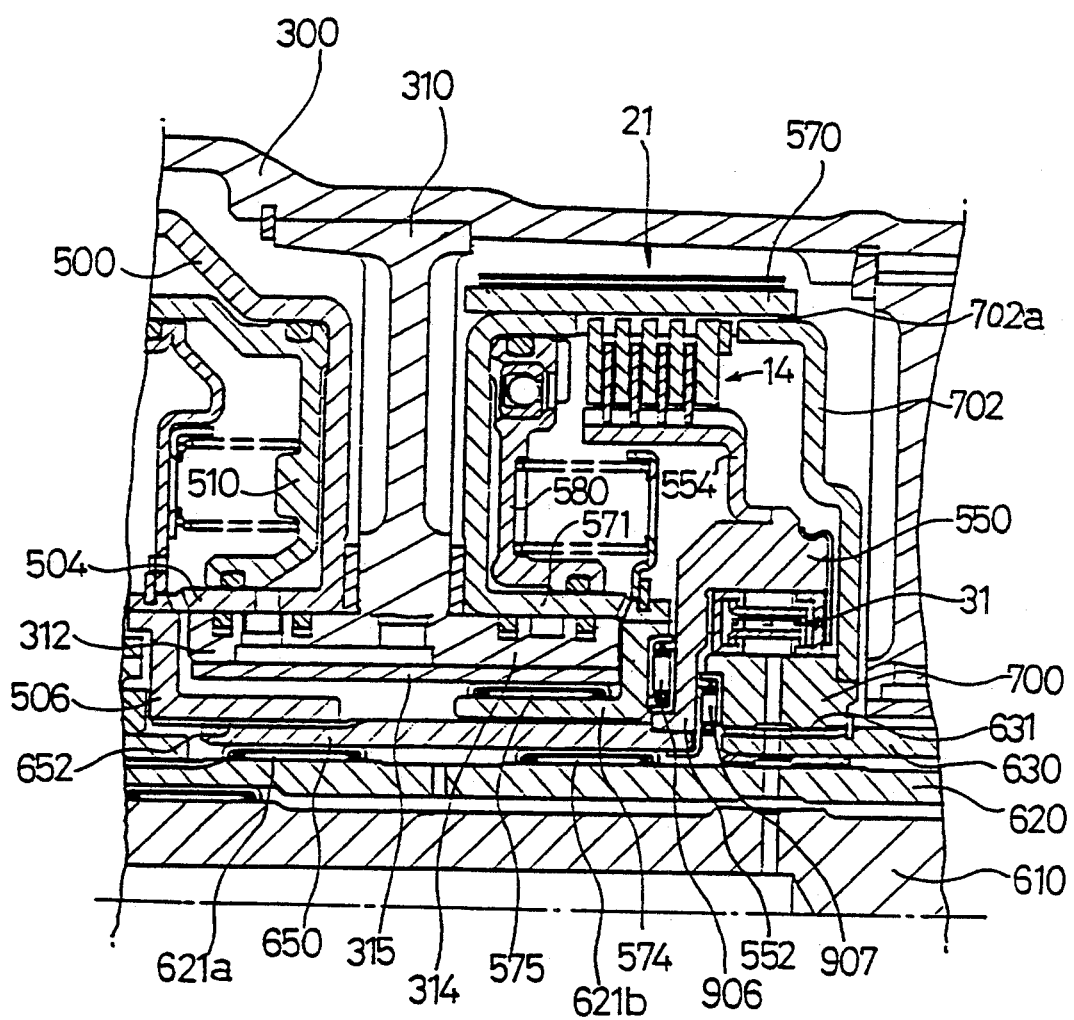
FIG. 3 is a sectional view showing a part of the automatic transmission.

The present invention relates particularly to a clutch device of an automatic transmission having the aforementioned constitution, which will be described in detail with reference to FIG. 3.

As described in FIG. 1, the input and output shafts are supported by a member formed integral with the transmission case, and a first intermediate shaft 610 is supported at its front and rear ends by the input and output shafts. A second intermediate shaft 620 is supported at two points by the outer peripheral portion of the first intermediate shaft 610. A sleeve 650 is supported by the second intermediate shaft 620 through supporting members 621a and 621b such as bearings. On the rear portion of the sleeve 650 is supported a third intermediate shaft 630 at two points. With the front end of the sleeve 650 a connecting member 506 is engaged through a spline 652. The connecting member 650 is integrally connected with an inner cylinder 504 of a drum 500 containing a second clutch 12.

The sleeve 650 is connected at the rear end to a flange forming the side wall of an outer race of a first one-way clutch 31. On the outer periphery of the outer race 550 is integrally fixed a hub 554 of a forth clutch 14 components. A drum 570 containing the fourth clutch 14 components is constituted of an outer cylinder and an inner cylinder; on the outer periphery of the outer cylinder is mounted a first brake 21 of a band type. In the drum 570 a clutch piston 580 which presses friction plates and separate plates of the fourth clutch 14 is inserted, and a connecting member 574 is fixedly mounted on an inner cylinder 571.

The inner peripheral section of a first central supporting member 310 secured in a transmission case 300 is formed in cylindrical sections 312 and 314 projecting longitudinally, In the inner peripheral part of the cylindrical sections 312 and 314 a sleeve 315 is fitted by pressing to form an oil passage. The front cylindrical section 312 is provided with an oil passage to supply the servo oil pressure to a clutch piston 510 which operates friction plates and separate plates of the second clutch 12 through the inner cylinder 504 of the drum 500. The rear cylindrical section 314 is provided with an oil passage for supplying the servo oil pressure to the clutch piston 580 which presses friction plates and separate plates of the fourth clutch 14 through the inner cylinder 571 of the drum 570. The sleeve 315 supports the outer peripheral section of the connecting member 574 through a bearing 575 in the inner peripheral section.

The inner periphery of the rear end of the drum 570 is connected to a flange 702 formed integral with an inner race 700 of the first one-way clutch 31 through splines 702a. Between the inner periphery of the outer race 550 and the outer periphery of the inner race 700 is disposed the first one-way clutch 31.

The inner peripheral side of the inner race 700 is connected to the front end portion of the third intermediate shaft 630 through splines 631. On the rear end section of the third intermediate shaft 630 is formed a sun gear 121 of the second simple planetary gearset.

The flange 552 of the outer race 550 has thrust bearings 906 and 907 on both sides thereof. These thrust bearings serve to receive a thrust acting on the outer race 550 and the inner race 700.

Since this device, as stated previously, contains clutch components in the drum on the outer peripheral section of which a band brake is mounted, and is independently supported by a member formed integral with the case, the drum can be firmly supported and achieve a smooth gearshifting.

As shown in Table 1, the fourth clutch 14 is applied at the engine brake application in the forward 1st gear and in the reverse.

Drive range, in the 1st gear, the first one-way clutch 31 is locked up with the outer race 550 and the inner race 700 being in engagement. Therefore when the fourth clutch 14 is released, the fist one-way clutch 31 will not make a relative rotation, and accordingly no drag of the first one-way clutch 31 will occur. In the 2nd speed, the outer race 550 and the hub 554 remain stationary. while the inner race 700 and the drum 570 rotate. However, as no power is transmitted, bearings are little burdened. In the 3rd speed, the hub 554 and the drum 570 rotate in opposite directions, at high relative speeds; but no power is transmitted. Accordingly, as little stress is exerted to the hub 554 and the drum 570, no drag likely to be caused. In the 4th and 4Ath speeds, the hub 554 and the drum 570 rotate at the same rate. In the 5th speed, the first brake 21 is applied to hold the drum 570 anchored. The 5th gear is often used many hours. When the drum 570 is held anchored, the inner race 700 and the third intermediate shaft 630 are held anchored, receiving a reaction force. To the outer race 550 an input torque is applied and therefore the first one-way clutch 31 overruns. The inner peripheral section of the drum 570 and the flange 702 of the inner race 700 are splined by means of the splines 702a. So, only a torque is transmitted between the drum 570 and the flange 702 without being affected by any other stress, thereby assuring the concentricity of the outer race 550 and the inner race 700 of the one-way clutch 31.

The inner cylinder 571 of the drum 570 is fixed to the connecting member 574. This connecting member 574 is supported by the first central supporting member 310 through the bearing 575. The drum 570, therefore, is independently supported, and gives no effect to the support construction of bearing members used therein.

The automatic transmission of this invention, as described above, is of the construction that clutch components are contained in the drum, a band brake is mounted on the outer cylinder of the drum, and the clutch hub is connected to the outer race of the one-way clutch while the drum is connected to the inner race of the one-way clutch. The drum is independently supported by a central supporting member fixedly mounted on the transmission case, thereby achieving the firm support of the drum. Since the drum and the inner race of the one-way clutch are splined, only the torque is transmitted between the drum and the inner race, giving no adverse effect to the centering of the inner race. Also since the clutch hub is supported at two points as one unit with the outer race, the drum and the hub can perform smooth relative rotation even when the clutch is released.

What is claimed is:

1. An automatic transmission having a change-speed transmission using a plurality of planetary gearsets and friction elements, said automatic transmission comprising: a central supporting member fixed to a transmission case having a cylindrical section; a drum having an outer cylinder and an inner cylinder, said inner cylinder being rotatably mounted on the cylindrical section and supported by the central supporting member; clutch components having a clutch piston, friction plates, separate plates and a clutch hub disposed in the drum; a band brake mounted on the outer cylinder of the drum; and a one-way clutch having an outer race connected to the clutch hub, and an inner race connected to the outer cylinder of the drum.

2. An automatic transmission as claimed in claim 1, furthermore comprising: a flange member for connecting the inner race of the one-way clutch to the outer cylinder of the drum; said flange member being formed integral with the inner race and being splined with the outer cylinder of the drum.

3. An automatic transmission as claimed in claim 1, furthermore comprising an input shaft supported by the transmission case: an output shaft supported by the transmission case; a first intermediate shaft supported at the front and rear end sections by the input shaft and the output shaft through bearings; a second intermediate shaft of cylindrical form supported on the first intermediate shaft through bearings; a cylindrical sleeve supported on the second intermediate shaft through bearings; said outer race of said one-way clutch being unitariiy connected with said sleeve.

4. An automatic transmission as claimed in claim 3, furthermore comprising: a third intermediate shaft supported on the second intermidiate shaft bearings; said inner race of the one-way clutch is splined with the third intermediate shaft.

* * * * *